United States Patent
Rupert

(10) Patent No.: US 12,191,443 B2
(45) Date of Patent: Jan. 7, 2025

(54) ARGYRODITES DOPED WITH THIOPHILIC METALS

(71) Applicant: Blue Current, Inc., Hayward, CA (US)

(72) Inventor: Benjamin Rupert, Berkeley, CA (US)

(73) Assignee: Blue Current, Inc., Hayward, CA (US)

( * ) Notice: Subject to any disclaimer, the term of this patent is extended or adjusted under 35 U.S.C. 154(b) by 14 days.

(21) Appl. No.: 16/947,793

(22) Filed: Aug. 17, 2020

(65) Prior Publication Data

US 2021/0050620 A1 Feb. 18, 2021

Related U.S. Application Data

(60) Provisional application No. 62/952,085, filed on Dec. 20, 2019, provisional application No. 62/888,323, filed on Aug. 16, 2019.

(51) Int. Cl.
| | |
|---|---|
| *H01M 10/0562* | (2010.01) |
| *C01B 25/14* | (2006.01) |
| *C01D 15/00* | (2006.01) |
| *H01M 4/58* | (2010.01) |
| *H01M 10/0525* | (2010.01) |

(52) U.S. Cl.
CPC ......... *H01M 10/0562* (2013.01); *C01B 25/14* (2013.01); *C01D 15/00* (2013.01); *H01M 4/5815* (2013.01); *H01M 10/0525* (2013.01); *C01P 2002/72* (2013.01); *C01P 2002/76* (2013.01); *C01P 2002/77* (2013.01); *C01P 2006/40* (2013.01); *H01M 2300/0082* (2013.01); *H01M 2300/0091* (2013.01)

(58) Field of Classification Search
CPC . H01M 2300/0065; H01M 2300/0068; H01M 2300/008; H01M 2300/0082; H01M 2300/0091; C01B 25/14
See application file for complete search history.

(56) References Cited

U.S. PATENT DOCUMENTS

| | | | |
|---|---|---|---|
| 8,741,484 B2 | 6/2014 | Kandasamy et al. | |
| 9,017,839 B2 | 4/2015 | Tsuchida et al. | |
| (Continued) | | | |

FOREIGN PATENT DOCUMENTS

| | | |
|---|---|---|
| CN | 106848391 A | 6/2017 |
| CN | 108493479 | 9/2018 |
| (Continued) | | |

OTHER PUBLICATIONS

US Office Action dated Aug. 27, 2020 issued in U.S. Appl. No. 16/829,962.

(Continued)

*Primary Examiner* — Brittany L Raymond
(74) *Attorney, Agent, or Firm* — Weaver Austin Villeneuve & Sampson LLP

(57) ABSTRACT

Provided herein are solid materials that are ionically conductive and electrochemically stable. Embodiments of the solid materials are argyrodite-type compositions that have high ionic conductivity. The compositions include small amounts of thiophilic metals, whose binary sulfides do not react with water to hydrogen sulfide ($H_2S$). As such, $H_2S$ release is minimized or eliminated. Also provided are methods of fabricating the materials and batteries and battery components containing the materials.

14 Claims, 8 Drawing Sheets

(56) References Cited

U.S. PATENT DOCUMENTS

| | | | |
|---|---|---|---|
| 9,093,722 | B2 | 7/2015 | Zhang et al. |
| 9,105,941 | B2 | 8/2015 | Ohtomo et al. |
| 9,812,734 | B2* | 11/2017 | Miyashita ......... H01M 10/0562 |
| 9,899,701 | B2 | 2/2018 | Miyashita et al. |
| 9,899,702 | B2 | 2/2018 | Miyashita et al. |
| 9,926,411 | B1 | 3/2018 | Burdynska et al. |
| 9,972,838 | B2 | 5/2018 | Teran et al. |
| 10,079,404 | B1 | 9/2018 | Burdynska et al. |
| 11,394,054 | B2 | 7/2022 | Villaluenga et al. |
| 11,394,064 | B2 | 7/2022 | Honjo |
| 11,572,459 | B2 | 2/2023 | Burdynska et al. |
| 2015/0147660 | A1 | 5/2015 | Fujiki et al. |
| 2015/0357675 | A1 | 12/2015 | Ohtomo et al. |
| 2015/0372345 | A1 | 12/2015 | Kato et al. |
| 2016/0226097 | A1 | 8/2016 | Wegner et al. |
| 2016/0293946 | A1 | 10/2016 | Ritter et al. |
| 2017/0162862 | A1 | 6/2017 | Thielen et al. |
| 2017/0250439 | A1 | 8/2017 | Nitta et al. |
| 2017/0352916 | A1 | 12/2017 | Miyashita et al. |
| 2018/0351148 | A1* | 12/2018 | Schneider ............ H01M 4/382 |
| 2019/0081352 | A1 | 3/2019 | Sasaki et al. |
| 2019/0097262 | A1 | 3/2019 | Chen et al. |
| 2019/0140312 | A1 | 5/2019 | Ramanathan et al. |
| 2019/0140313 | A1 | 5/2019 | Terai et al. |
| 2019/0148769 | A1 | 5/2019 | Aihara et al. |
| 2019/0221884 | A1 | 7/2019 | Utsuno et al. |
| 2019/0260018 | A1 | 8/2019 | Matsuyama et al. |
| 2019/0312304 | A1 | 10/2019 | Uesugi et al. |
| 2020/0087155 | A1 | 3/2020 | Rupert |
| 2020/0403267 | A1 | 12/2020 | Li et al. |
| 2021/0047195 | A1 | 2/2021 | Rupert |
| 2022/0271288 | A1 | 8/2022 | Burdynska et al. |
| 2024/0198419 | A1 | 6/2024 | Rupert et al. |

FOREIGN PATENT DOCUMENTS

| | | |
|---|---|---|
| EP | 3499629 A1 | 6/2019 |
| EP | 3 407 412 | 4/2021 |
| JP | 2011076792 A | 4/2011 |
| JP | 2012054212 A | 3/2012 |
| JP | 2016134316 A | 7/2016 |
| JP | 2016534493 A | 11/2016 |
| JP | 2017010936 A | 1/2017 |
| JP | 2017045613 A | 3/2017 |
| JP | 2017152352 A | 8/2017 |
| JP | 2017157300 A | 9/2017 |
| JP | 2017199631 A | 11/2017 |
| JP | 2018029058 A | 2/2018 |
| JP | 2020522091 A | 7/2020 |
| WO | WO 2015/043889 A1 | 4/2015 |
| WO | WO-2017002971 A1 | 1/2017 |
| WO | WO 2018/092366 A | 5/2018 |
| WO | WO-2018218057 A2 | 11/2018 |
| WO | WO-2019098245 A1 | 5/2019 |
| WO | WO-2019131725 A1 | 7/2019 |
| WO | WO 2020/252427 | 12/2020 |
| WO | WO-2021251347 A1 | 12/2021 |

OTHER PUBLICATIONS

US Final Office Action dated Dec. 1, 2020 issued in U.S. Appl. No. 16/829,962.
US Notice of Allowance dated Feb. 1, 2021 issued in U.S. Appl. No. 16/829,962.
US Office Action dated Mar. 8, 2021 issued in U.S. Appl. No. 16/829,962.
US Final Office Action dated Sep. 23, 2021 issued in U.S. Appl. No. 16/829,962.
International Search Report and Written Opinion dated Dec. 2, 2019 issued in PCT/US2019/051990.
International Preliminary Report on Patentability and Written Opinion dated Apr. 1, 2021 issued in PCT/US2019/051990.
International Search Report and Written Opinion dated Nov. 13, 2020 issued in Application No. PCT/US20/70257.
Invitation to Pay additional Fees dated Sep. 16, 2020, issued in Application No. PCT/US20/70257.
International Search Report and Written Opinion dated Oct. 21, 2020 issued in Application No. PCT/US20/70412.
Kong, et al., "Structural Characterisation of the Li Argyrodites Li7PS6 and Li7PSe6 and their Solid Solutions: Quantification of Site Preferences by MAS-NMR Spectroscopy," Chem. Eur. J., 2010, vol. 16, pp. 5138-5147.
Chen, HM et al., "Stability and ionic mobility in argyrodite-related lithium-ion solid electrolytes," Phys. Chem. Chem. Phys, vol. 17, pp. 16494-16506, May 29, 2015.
Chen, T. et al., "Argyrodite Solid Electrolyte with Stable Interface and Superior Dendrite Suppression Capability Realized by ZnO Co-doping," ACS Applied Materials & Interfaces, American Chemical Society, DOI: 10.1021/acsami.9b13313, Publication Date (Web) Oct. 9, 2019, Downloaded from pubs.acs.org on Oct. 13, 2019, 30 pages.
Bernges, T. et al., "Competing Structural Influences in the Li Superionic Conducting Argyrodites Li6PS5-xSexBr (0≤x≤1) upon Se Substitution," ACS Publications, Inorganic Chemistry, DOI: 10.1021/acs.inorgchem.8b02443, pubs.acs.org/IC, Aug. 29, 2018, 9 pages.
Kong, S. et al., "Li6PO5Br and Li6PO5Cl: The first Lithium-Oxide-Argyrodites," Wiley-VCH Verlag GmbH & Co. KGaA, Weinheim, DOI: 10.1002/zaac.201000121, 2010, 1920-1924.
Schneider, H. et al., "Stabilization of Highly Conductive Lithium Argyrodites by Means of Lithium Substitution: The Case of Li6Fe0.5PS6," Wiley-VCH Verlag GmbH & Co. KGaA, Weinheim, Wiley Online Library, ChemPubSOc Europe, DOI: 10.1002/slct.201803388, ChemistrySelect, 2019, 3351-3354.
Dopant', Wikipedia [retrieved from internet on Sep. 28, 2020 (Sep. 28, 2020) retrieved from 1 <https://en.wikipedia.org/wiki/Dopant>] p. 1.
Extended European search report dated Jun. 10, 2022, in Application No. EP19861315.0.
International Preliminary Report on Patentability dated Mar. 3, 2022, in Application No. PCT/US2020/070412.
International Preliminary Report on Patentability dated Jan. 20, 2022 in PCT Application No. PCT/US2020/070257.
JP Office Action dated Nov. 22, 2022 in Application No. CN201980067972.3 with English translation.
U.S. Non-Final Office Action dated May 13, 2022 in U.S. Appl. No. 16/829,962.
U.S. Office Action dated Apr. 1, 2022, in U.S. Appl. No. 16/576,570.
U.S. Appl. No. 17/986,773, inventors Rupert., filed Nov. 14, 2022.
U.S. Restriction Requirement dated Oct. 7, 2022 in U.S. Appl. No. 16/576,570.
Yu. C, et al., "Synthesis, structure and electrochemical performance of the argyrodite $Li_6PS_5Cl$ solid electrolyte for Li-ion solid state batteries", Electrochimica Acta, vol. 215, pp. 93-99.
CN Office Action dated Jul. 12, 2023, in Application No. CN201980067972.3 with English translation.
JP Office Action dated Sep. 12, 2023, in application No. JP2021-515186.
U.S. Final Office Action dated Aug. 4, 2023, in U.S. Appl. No. 16/576,570.
U.S. Non-Final office Action dated Jan. 26, 2023 in U.S. Appl. No. 16/576,570.
Zhang, Z., et al., "Ali-in-one Improvement Toward Li6PS5Br—Based Solid Electrolyte Triggered by Compositional Tune", Journal of Power Sources, 2019, 410-411, pp. 162-170.
CN Office Action dated Dec. 7, 2023 in CN Application No. 201980067972.3 with English Translation.
Database WPI Week 201943 Thomson Scientific, London, GB; AN 2019-45721N XP002809879.
Database WPI Week 201955 Thomson Scientific, London, GB; AN 2019-578147 XP002809880.
EP Extended European Search Report dated Oct. 5, 2023, in Application No. EP20854194.6.
U.S. Non-Final Office Action dated Mar. 1, 2024 in U.S. Appl. No. 16/576,570.

(56) References Cited

OTHER PUBLICATIONS

U.S. Appl. No. 18/556,807, inventors Rupert B, et al., filed Oct. 23, 2023.
EP Office Action dated May 22, 2024, in EP Application No. 20854194.6.
JP Office Action dated Sep. 12, 2023, in application No. JP2021-515186 with English translation.
U.S. Final office Action dated Jun. 8, 2023 in U.S. Appl. No. 17/304,645.
U.S. Non-Final office Action dated Aug. 30, 2022 in U.S. Appl. No. 17/304,645.
U.S. Non-Final Office Action dated Jan. 19, 2024 in U.S. Appl. No. 17/304,645.
Yu. C, et al., "Revealing the relation between the structure, Li-ion conductivity and solid-state battery performance of the argyrodite $Li_6PS_5Br$ solid electrolyte", Journal of Materials Chemistry A, 2017, vol. 5, pp. 21178-81188.
Zhang. J, et al., "All-solid-state batteries with slurry coated $LiNi0.8Co0.1Mn0.1O2$ composite cathode and $Li_6PS_5Cl$ electrolyte: Effect of content", Journal of Power Sources 391, 2018 pp. 73-79.
CN Office Action dated Aug. 22, 2024 in CN Application No. 201980067972.3 with English translation.
KR Office Action dated Jul. 10, 2024 in KR Application No. 10-2021-7011491, with English Translation.
U.S. Notice of Allowance dated Jul. 30, 2024 in U.S. Appl. No. 16/576,570.
U.S. Notice of Allowance dated Jul. 31, 2024 in U.S. Appl. No. 17/304,645.
U.S. Restriction requirement dated Aug. 27, 2024 in U.S. Appl. No. 17/626,092.
JP Office Action dated Aug. 27, 2024 in JP Application No. 2022-509675 with English translation.

\* cited by examiner

ARGYRODITES DOPED WITH THIOPHILIC METALS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Solid electrolytes present various advantages over liquid electrolytes for secondary batteries. For example, in lithium ion batteries, inorganic solid electrolytes may be less flammable than conventional liquid organic electrolytes. Solid electrolytes can also faciliate use of a lithium metal electrode by resisting dendrite formation. Challenges to using solid electrolytes include low conductivities and poor electrochemical stability.

SUMMARY

Provided herein are solid materials that are ionically conductive and electrochemically stable. Embodiments of the solid materials are argyrodite-type compositions that have high ionic conductivity. The compositions include small amounts of thiophilic metals, whose binary sulfides do not react with water to hydrogen sulfide ($H_2S$). As such, $H_2S$ release is minimized or eliminated. Also provided are methods of fabricating the materials and batteries and battery components containing the materials.

One aspect of the disclosure relates to a composition including an alkali metal argyrodite sulfide-based ion conductor doped with a thiophilic element. The thiophilic element may be a thiophilic metal selected from manganese (Mn), iron (Fe), cobalt (Co), nickel (Ni), copper (Cu), zinc (Zn), mercury (Hg), molybdenum (Mo), and combinations thereof. According to various embodiments, the ratio of thiophilic metal atoms to sulfur atoms in the alkali metal argyrodite sulfide-based ion conductor is at least 1:120. In some embodiments, the ratio of thiophilic metal atoms to sulfur atoms in the alkali metal argyrodite sulfide-based ion conductor is at least 1:50.

In some embodiments, the ratio of thiophilic metal atoms to sulfur atoms in the alkali metal argyrodite sulfide-based ion conductor is no more than 1:1. In some embodiments, the ratio of thiophilic metal atoms to sulfur atoms in the alkali metal argyrodite sulfide-based ion conductor is no more than 1:4.

In some embodiments, the alkali metal is one of lithium (Li), sodium (Na) or potassium (K). In some embodiments, the alkali metal is lithium. In some embodiments, the alkali metal argyrodite sulfide-based ion conductor is given by the formula:

$$A_{7-x-(z*y)}M^z{}_yPS_{6-x}Hal_x$$

wherein
A is the alkali metal;
M is the thiophilic metal;
Hal is selected from chlorine (Cl), bromine (Br), and iodine (I);
z is the oxidation state of the metal;
$0<x\leq2$; and
$0<y<(7-x)/z$.

In some embodiments, $z>+1$. In some embodiments, $z=+2$. In some embodiments, $1\leq x\leq1.6$. In some embodiments, $0.1\leq y\leq2-x$. In some embodiments, alkali metal argyrodite sulfide-based ion conductor is given by the formula:

$$A_{7-x+n-(z*y)}M^z{}_yPS_{6-x}Hal_{x+n}$$

wherein
A is the alkali metal;
M is the thiophilic metal;
Hal is selected from chlorine (Cl), bromine (Br), and iodine (I);
z is the oxidation state of the metal;
$0.05\leq n\leq0.9$
$-3.0x+1.8\leq n\leq-3.0x+5.7$
$0\leq y<(7-x)/z$; and
$0<x\leq2$.

In some embodiments, $z>+1$. In some embodiments, $z=+2$. In some embodiments, the ratio of thiophilic metal atoms to sulfur atoms in the alkali metal argyrodite sulfide-based ion conductor is at least 1:120. In some embodiments, the ratio of thiophilic metal atoms to sulfur atoms in the alkali metal argyrodite sulfide-based ion conductor is at least 1:50. In some embodiments, the alkali metal argyrodite sulfide-based ion conductor is single phase material.

Another aspect relates to a composite film of particles comprising a thiophilic metal-doped argyrodite in a polymer. The argyrodite may be any thiophilic doped argyrodite sulfide-based ion conductor as described here. In some embodiments, the polymer is a hydrophobic polymer. In some embodiments, the polymer is not ionically conductive. In some embodiments, the polymer is styrene ethylene butylene styrene (SEBS), styrene-butadiene-styrene (SBS), styrene-isoprene-styrene (SIS), styrene-isoprene/butadiene-styrene (SIBS), styrene-ethylene/propylene (SEP), styrene-ethylene/propylene-styrene (SEPS), and isoprene rubber (IR).

In some embodiments, the polymer is a copolymer that comprises plastic and elastic segments. In some embodiments, the composite film is between 0.5 wt %-60 wt % polymer, 1 wt %-40 wt % polymer, or 5 wt %-30 wt % polymer.

Another aspect of the disclosure relates to a slurry, paste, or solution comprising one or more solvents, a polymer, and ionically conductive particles comprising a thiophilic metal-doped argyrodite as described herein. In some embodiments, the polymer is a hydrophobic polymer. In some embodiments, the polymer is not ionically conductive. In some embodiments, the polymer is styrene ethylene butylene styrene (SEBS), styrene-butadiene-styrene (SBS), styrene-isoprene-styrene (SIS), styrene-isoprene/butadiene-styrene (SIBS), styrene-ethylene/propylene (SEP), styrene-ethylene/propylene-styrene (SEPS), and isoprene rubber (IR). In some embodiments, the polymer is a copolymer that comprises plastic and elastic segments.

Another aspect of the disclosure relates to a composition comprising a transition metal oxide active material, thiophilic metal doped argyrodite as described herein, and an organic polymer. In some embodiments, the polymer is a hydrophobic polymer. In some embodiments, the polymer is not ionically conductive. In some embodiments, the polymer is styrene ethylene butylene styrene (SEBS), styrene-butadiene-styrene (SBS), styrene-isoprene-styrene (SIS), styrene-isoprene/butadiene-styrene (SIBS), styrene-ethylene/propylene (SEP), styrene-ethylene/propylene-styrene (SEPS), and isoprene rubber (IR). In some embodiments, the polymer is a copolymer that comprises plastic and elastic segments. In some embodiments, the composition further comprises a conductive additive. A battery including the composition and a mesh current collector embedded in the composition may be provided.

Another aspect of the disclosure relates to a composition comprising a silicon-containing active material, a graphitic active material, thiophilic metal doped argyrodite as described herein, and an organic polymer. In some embodiments, the polymer is a hydrophobic polymer. In some embodiments, the polymer is not ionically conductive. In some embodiments, the polymer is styrene ethylene butylene styrene (SEBS), styrene-butadiene-styrene (SBS), styrene-isoprene-styrene (SIS), styrene-isoprene/butadiene-styrene (SIBS), styrene-ethylene/propylene (SEP), styrene-ethylene/propylene-styrene (SEPS), and isoprene rubber (IR). In some embodiments, the polymer is a copolymer that comprises plastic and elastic segments. In some embodiments, the composition further comprises a conductive additive. In these or other embodiments, the argyrodite may be according to Formula I or II. A battery including the composition and a mesh current collector embedded in the composition may be provided.

These and other aspects are described further below with reference to the Figures.

DESCRIPTION

Provided herein are solid materials that are ionically conductive and electrochemically stable. The materials are argyrodite-type compositions that have high ionic conductivity and easy to process. The compositions include small amounts of thiophilic metals, whose binary sulfides do not react with water to hydrogen sulfide ($H_2S$). As such, $H_2S$ release is minimized or eliminated. Also provided are methods of fabricating the materials and batteries and battery components containing the materials.

Introduction

The mineral Argyrodite, $Ag_8GeS_6$, can be thought of as a co-crystal of $Ag_4GeS_4$ and two equivalents of $Ag_2S$. Substitutions in both cations and anions can be made in this crystal while still retaining the same overall spatial arrangement of the various ions. In $Li_7PS_6$, $PS_4^{3-}$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. These structural analogs of the original Argyrodite mineral are referred to as argyrodites as well.

Both $Ag_8GeS_6$ and $Li_7PS_6$ are orthorhombic crystals at room temperature, while at elevated temperatures phase transitions to cubic space groups occur. Making the further substitution of one equivalent of LiCl for one $Li_2S$ yields the material $Li_6PS_5Cl$, which still retains the argyrodite structure but undergoes the orthorhombic to cubic phase transition below room temperature and has a significantly higher lithium-ion conductivity. Because the overall arrangement of cations and anions remains the same in this material as well, it is also commonly referred to as an argyrodite. Further substitutions which also retain this overall structure may therefore also be referred to as argyrodites. Alkali metal argyrodites more generally are any of the class of conductive crystals with alkali metals occupying $Ag+$ sites in the original Argyrodite structure, and which retain the spatial arrangement of the anions found in the original mineral.

Figure 1:
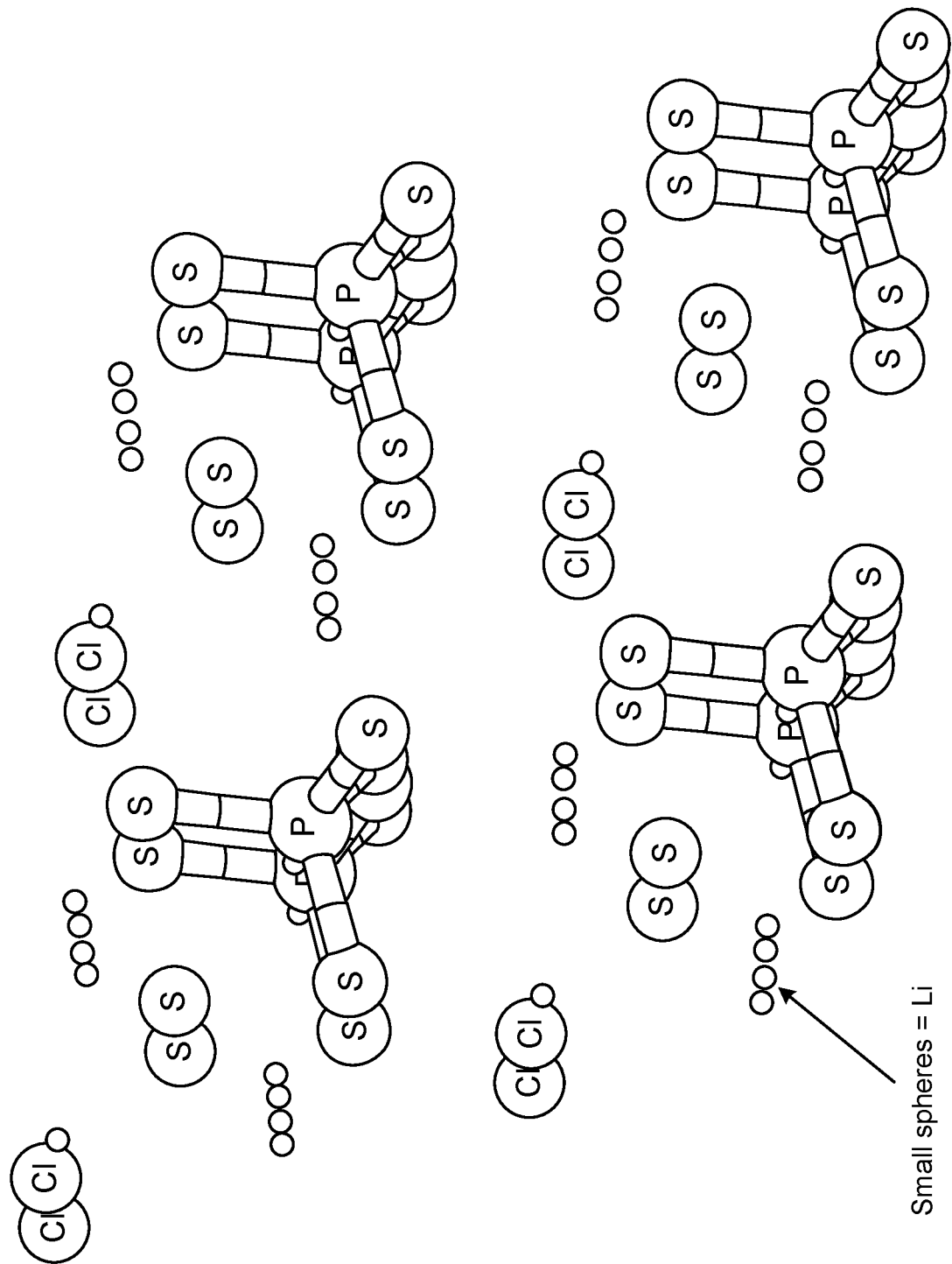
FIG. 1 shows the crystal structure of cubic argyrodite $Li_6PS_5Cl$.

In one example, a lithium-containing example of this mineral type, $Li_7PS_6$, $PS_4^{3-}$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. As indicated above, making the further substitution of one equivalent of LiCl for one $Li_2S$ yields the material $Li_6PS_5Cl$, which still retains the argyrodite structure. FIG. 1 shows a cubic argyrodite $Li_6PS_5Cl$. In the example of FIG. 1, $Li^+$ occupies the $Ag^+$ sites in the Argyrodite mineral, $PS_4^{3-}$ occupies the $GeS_4^{4-}$ sites in the original, and a one to one ratio of $S^{2-}$ and $Cl^-$ occupy the two original $S^{2-}$ sites.

There are various manners in which substitutions may be made that retain the overall argyrodite structure. For example, the original mineral has two equivalents of $S^{2-}$, which can be substituted with chalcogen ions such as $O^{2-}$, $Se^{2-}$, and $Te^{2-}$. A significant fraction of the of $S^{2-}$ can be substituted with halogens. For example, up to about 1.6 of the two equivalents of $S^{2-}$ can be substituted with $Cl^-$, $Br$, and $I^{-1}$, with the exact amount depending on other ions in the system. While $Cl^-$ is similar in size to $S^{2-}$, it has one charge instead of two and has substantially different bonding and reactivity properties. Other substitutions may be made, for example, in some cases, some of the $S^{2-}$ can be substituted with a halogen (e.g., $Cl^-$) and the rest replaced with $Se^{2-}$. Similarly, various substitutions may be made for the $GeS_4^{3-}$ sites. $PS_4^{3-}$ may replace $GeS_4^{3-}$; also $PO_4^{3-}$, $PSe_4^{3-}$, $SiS_4^{3-}$, etc. These are all tetrahedral ions with four chalcogen atoms, overall larger than $S^{2-}$, and triply or quadruply charged.

In other examples, which will be compared to the $Li_6PS_5Cl$ argyrodite structure described above, $Li_6PS_5Br$ and $Li_6PS_5I$ substitute larger halides in place of the chloride, e.g., $Li_6PO_5Cl$ and $Li_6PO_5Br$. Z. anorg. Allg. Chem., 2010, no. 636, 1920-1924, incorporated by reference herein for the purpose of describing certain argyrodites, contain the halide substitutions described as well as exchanging every sulfur atom in the structure, in both the $S^{2-}$ and $PS_4^{3-}$ ions, for oxygen. The phosphorus atoms in the $PS_4^{3-}$ ions found in most examples of lithium-containing argyrodites can also be partially or wholly substituted, for instance the series $Li_{7+x}M_xP_{1-x}S_6$ (M=Si, Ge) forms argyrodite structures over a wide range of x. See J. Mater. Chem. A, 2019, no. 7, 2717-2722, incorporated by reference herein for the purpose of describing certain argyrodites. Substitution for P can also be made while incorporating halogens. For example, $Li_{6+x}Si_xP_{1-x}S_5Br$ is stable from x=0 to about 0.5. See J. Mater. Chem. A, 2017, no. 6, 645-651, incorporated by reference herein for the purpose of describing certain argyrodites. Compounds in the series $Li_{7+x}M_xSb_{1-x}S_6$ (M=Si, Ge, Sn), where a mixture of $SbS_4^{3-}$ and $MS_4^{4-}$ are substituted in place of $PS_4^{3-}$ and I⁻ is used in place of Cl⁻, have been prepared and found to form the argyrodite structure. See J. Am. Chem. Soc., 2019, no. 141, 19002-19013, incorporated by reference herein for the purpose of describing certain argyrodites. Other cations besides lithium (or silver) can also be substituted into the cation sites. $Cu_6PS_5Cl$, $Cu_6PS_5Br$, $Cu_6PS_5I$, $Cu_6AsS_5Br$, $Cu_6AsS_5I$, $Cu_{7.82}SiS_{5.82}Br_{0.18}$, $Cu_7SiS_5I$, $Cu_{7.49}SiS_{5.49}I_{0.51}$, $Cu_{7.44}SiS_{5.44}I_{0.56}$, $Cu_{7.75}GeS_{5.75}Br_{0.25}$, $Cu_7GeS_5I$ and $Cu_{7.52}GeSe_{5.52}I_{0.48}$ have all been synthesized and have argyrodite crystal structures. See Z. Kristallogr, 2005, no. 220, 281-294, incorporated by reference herein for the purpose of describing certain argyrodites. From the list of examples, it can be seen that not only can single elements be substituted in any of the various parts of the argyrodite structure, but combinations of substitutions also often yield argyrodite structures. These include argyrodites described in US Patent Publication No. 20170352916 which include $Li_{7-x+y}PS_{6-x}Cl_{x+y}$, where x and y satisfy the formula $0.05 \leq y \leq 0.9$ and $-3.0x+1.8 \leq y \leq -3.0x+5.7$.

The argyrodites described here are sulfide-based ion conductors with a substantial (at least 20%, and often at least 50%) of the anions being sulfur-containing (e.g., $S^{2-}$ and $PS_4^{3-}$). Sulfide-based lithium argyrodite materials exhibit high Li⁺ mobility and are of interest in lithium batteries. As indicated above, an example material in this family is $Li_6PS_5Cl$, which is a ternary co-crystal of $Li_3PS_4$, $Li_2S$, and LiCl. Various embodiments of argyrodites described herein have thiophilic metals that may occupy lithium cation sites in the argyrodite crystal structure. In an argyrodite as shown in FIG. 1, each cation is coordinated to two sulfurs which are members of $PS_4^{3-}$ anions, one $S^{2-}$ sulfur anion, and two chloride anions. A thiophilic metal occupies some fraction of these lithium cation sites. Thiophilic metals may be used to similarly, dope other alkali metal argyrodites.

In certain embodiments, a plurality of Li cations is replaced with thiophilic cations. This suppresses hydrogen sulfide generation which otherwise occurs by the reaction of the $S^{2-}$ anion with atmospheric moisture. In an idealized or near idealized structure such as in FIG. 1, each thiophilic cation site directly coordinates to and prevents reaction of only one $S^{2-}$ sulfur anion. However, in the halogen-containing argyrodites, the sulfur and halogen sites show significant disorder, allowing thiophilic dopant atoms to be coordinated with 1, 2, or 3 $S^{2-}$ centers.

Suppression of hydrogen disulfide is advantageous as it is toxic and flammable, and can present a particularly severe hazard in device failure modes in which a casing opens causing potential exposure to an end user.

Compositions

Provided herein are alkali metal argyrodite sulfide-based ion conductors doped with a thiophilic metal. The thiophilic metal may be (Mn), iron (Fe), cobalt (Co), nickel (Ni), copper (Cu), zinc (Zn), mercury (Hg), and molybdenum (Mo), or combinations thereof. Other thiophilic elements may be used in alternate embodiments. The amount of thiophilic metal may be controlled to limit hydrogen sulfide while maintaining ionic conductivity. Too little thiophilic metal and there may be too much hydrogen sulfide generated. Too much thiophilic metal may lower ionic conductivity. In some embodiments, the amount of doping is characterized by the ratio of thiophilic metal atoms to sulfur atoms in the argyrodite. In some embodiments, the ratio of thiophilic metal atoms to sulfur atoms in the alkali metal sulfide-based ion conductor is at least 1:120. In some embodiments, it is at least 1:50. In some embodiments, the ratio of thiophilic metal atoms to sulfur atoms in the alkali metal argyrodite sulfide-based ion conductor is no more than 1:1, and in some embodiments, the ratio of thiophilic metal atoms to sulfur atoms in the alkali metal argyrodite sulfide-based ion conductor is no more than 1:4. In some embodiments, a ratio of 1:20 can result in sufficient hydrogen sulfide generation and less reduction in ionic conductivity than higher ratios. Examples of ranges of thiophilic metal atoms to sulfur atoms include 1:120-1:1; 1:120-1:4; 1:120-1:20; 1:50-1:1; 1:50-1:4, and 1:50-1:20. (It should be noted that although hydrogen sulfide generation is prevented by coordination with the S' anion, the ratios given are for the total sulfur atoms in the argyrodite.)

The upper limit on thiophilic metal dopant atoms is dependent on the oxidation state, with a 1:1 ratio achievable only with a +1 oxidation state. Examples of such argyrodites include $LiCu_5PS_5Cl$ and $Li_{1.1}Cu_{5.9}PS_{5.9}C_{10}$. For 1:4 ratios, examples include $Li_{3.5}Cu_{1.25}PS_5Cl$, $Li_{3.5}Ni_{1.25}PS_5Cl$ (oxidation state of +2) and $Li_{3.5}Fe_{0.833}PS_5Cl$ (oxidation state of +3).

Doping may alternatively be characterized as a mole percent of thiophilic atoms relative to sulfur atoms. In some embodiments, the argyrodite contains at least 0.83 mole percent thiophilic metal atoms with respect to sulfur atoms. In some embodiments, the argyrodite contains at least 2 mole percent thiophilic metal atoms with respect to sulfur atoms. Significant hydrogen sulfide suppression has been measured for an argyrodite with 2 mole percent Cu relative to sulfur ($Li_{5.8}Cu_{0.1}PS_5Cl$). In some embodiments, the argyrodite contains no more than 5 mole percent thiophilic metal atoms with respect to sulfur atoms. Example ranges include 0.8-5 mole percent thiophilic metal atoms with respect to sulfur atoms and 0.8-2 mole percent thiophilic metal atoms with respect to sulfur atoms.

Thiophilic metal doped argyrodites as described herein can be characterized by powder x-ray diffraction (XRD) to show that a substantial portion of the sample has the argyrodite structure, while elemental analysis techniques, such as ICP-MS, ICP-AES, and others, can be used to determine the identity of the doped metal(s) as well as metal to sulfur molar ratio.

In some embodiments, the alkali metal argyrodite sulfide-based ion conductors are in accordance with Formula I:

$$A_{7-x-(z*y)}M_zyPS_6-xHal_x \qquad \text{(Formula I)}$$

wherein

A is the alkali metal;

M is a metal selected from manganese (Mn), iron (Fe), cobalt (Co), nickel (Ni), copper (Cu), zinc (Zn), mercury (Hg), and molybdenum (Mo);

Hal is selected from chlorine (Cl), bromine (Br), and iodine (I);

z is the oxidation state of the metal;

$0 < x \leq 2$; and $0 < y < (7-x)/z$.

The oxidation state depends on the metal dopant. According to various embodiments, the following oxidation states may be used:

Mn, z=+2, +3, +4, +6, or +7

Fe, z=+2, +3, or +4

Co, z=+2, or +3

Ni, z=+1, +2, +3, or +4

Cu, z=+1 or +2
Zn, z=+2
Hg, z=+1 or +2
Mo, z=+2, +3, +4, +5, or +6.

In some embodiments, the thiophilic metal dopant is incorporated in a higher oxidation state than +1, and in particular embodiments, in the +2 state. Incorporation in the +1 state may result in plating out of the metal in devices such as batteries due to mobility of the incorporated +1 metal. Plating on a battery anode, for example, would reduce battery capacity, could cause unwanted reactions, and would negate the dopant's hydrogen sulfide suppressing effect. Higher oxidation states can lead to lower ionic conductivity by decreasing the concentration of lithium ions in the material.

The amount of halogen in the argyrodite is determined by x. In some embodiments, 1≤x≤1.6. For x<1 conductivity is generally low at room temperature. At some value of x<1, dependent on alkali metal and halogen used, the argyrodite structure transforms to the lower symmetry orthorhombic crystal structure. Doping with thiophilic metals is expected to stabilize the cubic structure at x<1 and a step function decrease in conductivity is not expected to occur. Argyrodites with x>1 are still expected to be advantageous, despite this stabilization effect, because of their generally higher conductivity and lower sulfur content. Increasing x above 1 increases conductivity until the structure is no longer stable around x≥1.6. For x>1.6, the argyrodite shows some instability and the composition may be mixture of argyrodite with other phases such as lithium sulfide, lithium halide, and lithium thiophosphate. The addition of the metal dopant may stabilize the composition, allowing more halogen to be used.

The amount of thiophilic metal dopant is characterized by y; for most practical applications, 0.1≤y≤(2−x)/z, if y is too low, there may not be sufficient hydrogen sulfide suppression; too high, and the ionic conductivity may be undesirably lowered. At high concentrations, incorporation of thiophilic metals may result inducing electronic conductivity, which may be undesirable in some cases. Compositions according to Formula I may be have M:S ratios of at least 1:120 or at least 1:50. In some embodiments, the M:S ratio is no more than 1:20.

Compositions of Formula I include those with mixed metals (i.e., the argyrodite is doped with multiple metals) and/or those with mixed halides (i.e., the argyrodite includes two or more of Cl, Br, and I, each at a halogen site). For mixed halides, $Hal_x$ refers to the total halogen content, e.g., for $Br_{0.9}Cl_{0.7}$, x is 1.6. For mixed metals, M refers to two or more metals, M1, M2, etc. The oxidation state and concentrations of each metal can be different, and for M1 the oxidation state is z1 and the amount of metal present y1. For metal M2 the oxidation state is z2 and the concentration is y2, and so on. In the case of mixed metals in the formula $A_{7-x-(z*y)}M^z_yPS_{6-x}Hal_x$, the total metal concentration y=y1+y2, and the charge z refers to the concentration weighted average charge of the metals in the system, defined as z=((z1*y1)+(z2*y2))/(y1+y2).

As indicated above, any alkali metal argyrodite sulfide-based ion conductor may be doped with a thiophilic metal to suppress hydrogen sulfide generation. These can include argyrodites as described in U.S. Patent 20170352916, which describes $Li_{7-x+y}PS_{6-x}Cl_{x+y}$ where x and y satisfy the formula 0.05≤y≤0.9 and −3.0x+1.8≤y≤−3.0x+5.7. In some embodiments, the alkali metal argyrodite sulfide-based ion conductor is given by the formula:

$$A_{7-x+n-(z*y)}M^z_yPS_{6-x}Hal_{x+n} \quad \text{(Formula II)}$$

wherein
A is the alkali metal;
M is a metal selected from manganese (Mn), iron (Fe), cobalt (Co), nickel (Ni), copper (Cu), zinc (Zn), mercury (Hg), and molybdenum (Mo);
Hal is selected from chlorine (Cl), bromine (Br), and iodine (I);
z is the oxidation state of the metal;
0.05≤n≤0.9
−3.0x+1.8≤n≤−3.0x+5.7
0≤y<(7−x)/z; and
0<x≤2.

The oxidation state depends on the metal dopant. According to various embodiments, the following oxidation states may be used:
Mn, z=+2, +3, +4, +6, or +7
Fe, z=+2, +3, or +4
Co, z=+2, or +3
Ni, z=+1, +2, +3, or +4
Cu, z=+1 or +2
Zn, z=+2
Hg, z=+1 or +2
Mo, z=+2, +3, +4, +5, or +6.

In some embodiments, −3.0x+1.8≤n≤−3.0x+5.

In some embodiments, the thiophilic metal dopant is incorporated in a higher oxidation state than +1, and in particular embodiments, in the +2 state. Incorporation in the +1 state may result in plating out of the metal in devices such as batteries due to mobility of the incorporated +1 metal. Plating on a battery anode, for example, would reduce battery capacity, could cause unwanted reactions, and would negate the dopant's hydrogen sulfide suppressing effect. Higher oxidation states can lead to lower ionic conductivity.

The amount of thiophilic metal dopant is characterized by y; for most practical applications, 0.1≤y≤(2−x)/z, if y is too low, there may not be sufficient hydrogen sulfide suppression; too high, and the ionic conductivity may be undesirably lowered. At high concentrations, incorporation of thiophilic metals may result inducing electronic conductivity, which may be undesirable in some cases. Compositions according to Formula II may be have M:S ratios of at least 1:120 or at least 1:50. In some embodiments, the M:S ratio is no more than 1:20. Formula II may include mixed metal and/or mixed halide systems, which are treated as described above with respect to Formula I.

Synthesis

Metal sulfides or metal halides may be used to dope the argyrodite during synthesis of the agyrodite. The metal sulfide or metal halide may be mixed with argyrodite precursors such as LiCl, $Li_2S$, and $P_2S_5$ or LiCl and $Li_3PS_4$ where Hal is Cl. The thiophilic metal doped argyrodites may be synthesized using one of three main synthetic methods: high energy ball-milling (mechanochemical synthesis), high-temperature solid-state or thermal synthesis, and solution synthesis.

High energy ball-milling applies mechanical energy to induce a chemical reaction between argyrodite precursors and forms a highly amorphous particle. An additional annealing step can be used to increase crystallinity, and thus conductivity, of the highly amorphous ball-milled argyrodite. Ball-milled argyrodite can be used incorporated into a composite fully or partially reacted, as well as before or after annealing.

In solid-state synthesis, argyrodite reagents are pre-mixed together and thermally reacted to form argyrodite phase. Unlike ball-milling, solid-state reactions are run at high temperatures that are similar to annealing temperatures, thus providing highly crystalline materials. The reaction might be performed directly in the presence of polymers, but high temperature might lead to the polymer degradation and lower temperatures might not be sufficient to fully react starting materials. The solid-state synthesis can also be pushed to full completion or stopped to form a mixture of argyrodite and precursors or intermediates. The reaction can be controlled by tuning synthesis times and temperatures, and such argyrodite can be mixed directly with polymers to form composites.

In argyrodite solution synthesis, reactants are mixed in an argyrodite solvent that enables full or partial dissolution or reagents, intermediates, and/or the products. The approach uses a multi-step solvent removal to obtain pure argyrodite. First, bulk solvent is removed at lower temperatures, typically below 100° C., leading to a mixture or argyrodite and argyrodite precursors, that include starting materials and complex intermediate compounds. Such argyrodite mixture can be incorporated into a composite, and residual solvent bound to argyrodite phase can serve as a sintering aid during thermal processing. During heat treatment residual solvent evaporates transforming precursors into argyrodite phase, while at the same time it helps to sinter inorganic particles via liquid phase sintering. Liquid phase sintering helps reduce pressure and temperature requirements for sintering, while at the same time leading to lower porosity and better densification. The second removal step of the argyrodite-bound solvent can be done prior to incorporation to a composite, obtaining argyrodite with the crystallinity and crystallite size dependent on the processing temperature and time. Such argyrodite can be incorporated into the composite.

Composites Including Thiophilic Metal Doped Argyrodites

In some embodiments, a thiophilic metal doped argyrodite may be mixed with a compliant material to form a composite solid ionic conductor. The compliant material may be an organic phase, for example, as described in U.S. Pat. Nos. 9,926,411 and 9,972,838, and U.S. patent application Ser. No. 16/241,784 incorporated by reference herein. The organic polymer phase may include one or more polymers and is chemically compatible with the inorganic ion conductive particles. In some embodiments, the organic phase has substantially no ionic conductivity, and is referred to as "non-conically conductive." Non-ionically conductive polymers are described herein have ionic conductivities of less than 0.0001 S/cm.

In some embodiments, the organic phase includes a polymer binder, a relatively high molecular weight polymer. A polymer binder has a molecular weight of at least 30 kg/mol, and may be at least 50 kg/mol, or 100 kg/mol. In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including polybutadiene (PBD) and polyisoprene (PI). The rubber blocks may or may be hydrogenated. Specific examples of polymer binders are styrene ethylene butylene styrene (SEBS), styrene-butadiene-styrene (SBS), styrene-isoprene-styrene (SIS), styrene-butadiene rubber (SBR), polystyrene (PSt), PBD, polyethylene (PE), and PI. Non-polar polymers do not coat the inorganic particles, which can lead to reduced conductivity.

Smaller molecular weight polymers may be used to improve the processability of larger molecular weight polymers such as SEBS, reducing processing temperatures and pressures, for example. These can have molecular weights of 50 g/mol to 30 kg/mol, for example. Examples include polydimethylsiloxane (PDMS), polybutadiene (PBD), and polystyrene. In some embodiments, the first component is a cyclic olefin polymer (COP), the first component is a polyalkyl, polyaromatic, or polysiloxane polymer having end groups selected from cyano, thiol, amide, amino, sulfonic acid, epoxy, carboxyl, or hydroxyl groups.

The main chain or backbone of the polymeric components of the organic phase do not interact with the inorganic phase. Examples of backbones include saturated or unsaturated polyalkyls, polyaromatics, and polysiloxanes. Examples of backbones that may interact too strongly with the inorganic phase include those with strong electron donating groups such as polyalcohols, polyacids, polyesters, polyethers, polyamines, and polyamides. It is understood that molecules that have other moieties that decrease the binding strength of oxygen or other nucleophile groups may be used. For example, the perfluorinated character of a perfluorinated polyether (PFPE) backbone delocalizes the electron density of the ether oxygens and allows them to be used in certain embodiments.

In some embodiments, hydrophobic block copolymers having both plastic and elastic copolymer segments are used. Examples include styrenic block coploymers such as SEBS, SBS, SIS, styrene-isoprene/butadiene-styrene (SIBS), styrene-ethylene/propylene (SEP), styrene-ethylene/propylene-styrene (SEPS), and isoprene rubber (IR).

In some embodiments, the organic phase is substantially non-ionically conductive, with examples of non-ionically conductive polymers including PDMS, PBD, and the other polymers described above. Unlike ionically conductive polymers such as polyethylene oxide (PEO), polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct. In some embodiments, one of these or another ionically conductive polymer may be used. PFPE's, referred to above, and described in Compliant glass-polymer hybrid single ion-conducting electrolytes for lithium ion batteries, PNAS, 52-57, vol. 113, no. 1 (2016), incorporated by reference herein, are ionically conductive, being single ion-conductors for lithium and may be used in some embodiments.

In some embodiments, the organic phase may included cross-linking. In some embodiments, the organic phase is a cross-linked polymer network. Cross-linked polymer networks can be cross-linked in-situ, i.e., after the inorganic particles are mixed with polymer or polymer precursors to form a composite. In-situ polymerization, including in-situ cross-linking, of polymers is described in U.S. Pat. No. 10,079,404, incorporated by reference herein.

The composite materials described herein may take various forms including films and slurries or pastes that may be used to fabricate composite films. According to various embodiments, the composites may include one of the following:

1) argyrodite precursors without argyrodite; and organic polymer;
2) argyrodite precursors, argyrodite, and organic polymer;
3) argyrodite with substantially no precursors; and organic polymer.

In some embodiments, the composites consist essentially of these constituents. In some other embodiments, additional components may be present as described further below. As indicated above, in some embodiments, the composites are provided as a solid film. Depending on the particular composition and the processing to date, the solid films may be provided in a device or ready for incorporation in a device without further processing, or may be provided in ready for in-situ processing of the argyrodite as described above. In the latter case, it may be provided as free-standing film or as incorporated into a device for processing.

The polymer matrix loading in the hybrid compositions may be relatively high in some embodiments, e.g., being at least 2.5%-30% by weight. According to various embodiments, it may between 0.5 wt %-60 wt % polymer, 1 wt %-40 wt % polymer, or 5 wt %-30 wt %. The composites form a continuous film.

The organic polymer is generally a non-polar, hydrophobic polymer as described above. In certain embodiments, it may be polymer precursors (monomers, oligomers, or polymers) that are also process in situ for polymerization and/or cross-linking. Such processing may occur during in situ processing of the argyrodite or prior to or after it.

In some embodiments, the argyrodite and/or precursors thereof, constitute 40 wt % to 95.5 wt % of the film. The balance may be organic polymer in some embodiments. In other embodiments, one or more additional components are present. Other components can include alkali metal ion salts, including lithium ion salts, sodium ion salts, and potassium ion salts. Examples include LiPF6, LiTFSI, LiBETI, etc. In some embodiments, the solid-state compositions include substantially no added salts. "Substantially no added salts" means no more than a trace amount of a salt. In some embodiments, if a salt is present, it does not contribute more than 0.05 mS/cm or 0.1 mS/cm to the ionic conductivity. In some embodiments, the solid-state composition may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, discussed further below, the solid-state compositions are incorporated into, or are ready to be incorporated into, an electrode and include electrochemically active material, and optionally, an electronically conductive additive. Examples of constituents and compositions of electrodes including argyrodites are provided below.

In some embodiments, the electrolyte may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

In some embodiments, the composites are provided as a slurry or paste. In such cases, the composition includes a solvent to be later evaporated. In addition, the composition may include one or more components for storage stability. Such compounds can include an acrylic resin. Once ready for processing the slurry or paste may be cast or spread on a substrate as appropriate and dried. In situ processing as described above may then be performed.

In Situ Processing of Thiophilic Metal Doped Argyrodite in Composites

Figure 2:
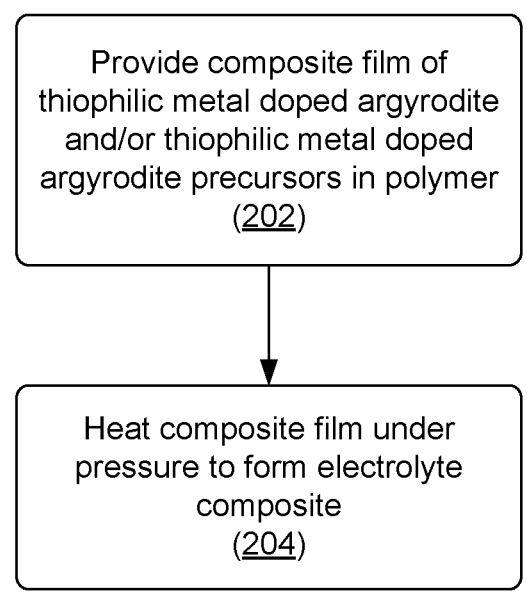
FIG. 2 is a process flow diagram that shows certain operations in methods of forming a composite film.

In some embodiments, phase transitions within inorganic conductor particles after their incorporation into composites are induced by thermal processing without degrading components of the organic phase. FIG. 2 is a process flow diagram that shows operations of forming a composite film. A composite film of a thiophilc metal doped argyrodite and/or precursors thereof in a polymer is provided. Unlike methods in which an inorganic is provided in an organic material for the purpose of sintering, the polymer in operation 202 is the polymer that will be in the eventual composite material (or a precursor thereof). Examples of polymers are described above. As indicated, the inorganic phase may include thiophilic metal doped argyrodite and/or precursors thereof. In some embodiments, the inorganic phase at 202 includes no argyrodite and only argyrodite precursors (e.g., $MCl_x$, LiCl, $Li_2S$, and $P_2S_5$; or $MCl_x$, LiCl, $MS_x$, and $Li_3PS_4$ to make $Li_{6-x-(z*y)}M^z{}_yPS_{5-x}Hal_{1+x}$). In some embodiments, the inorganic phase at 202 includes argyrodite and argyrodite precursors (e.g., $Li_{6-x-(z*y)}M^z{}_yPS_{5-x}Hal_{1+x}$, LiCl, MCl, $Li_2S$, and $P_2S_5$). And in some embodiments, the inorganic phase at 202 includes argyrodite with substantially no unreacted precursors. At 204, the composite film is heated under pressure to form a composite film including an argyrodite.

Example pressures include pressures on order of 1 MPa to 600 MPa, or 1 MPa to 100 MPa. During operation 204, one or more of the following occurs: the argyrodite reaction is driven to completion, the argyrodite is wholly or partially crystallized, argyrodite particles are sintered to form sintered particles. Temperatures are low enough to prevent thermal degradation of the polymer phase. As indicated above, this is district from sintering operations performed at high temperature in which particles in a polymer are sintered with the polymer burned off. In such operations, polymer may be backfilled to form a composite.

Figure 3:
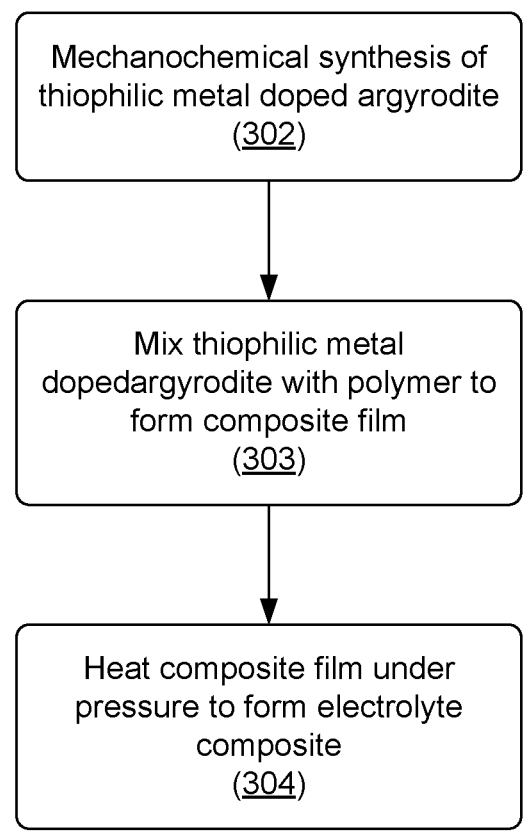
FIG. 3 is a process flow diagram that shows certain operations in methods of fabricating composite electrolytes.

FIG. 3 is a process flow diagram that illustrates certain operations in methods of fabricating composite electrolytes provided herein. The method in FIG. 3 is an example of a method according to FIG. 2. In the method of FIG. 3, at operation 302, mechanochemical synthesis of the thiophilic metal doped argyrodite is performed. As discussed above, this may involve high energy ball-milling of argyrodite precursors. According to various embodiments, the reaction may be allowed to go to completion or the ball-milling may be stopped with some argyrodite precursors purposefully left unreacted.

In some embodiments, the thiophilic metal doped argyrodite is then annealed ex-situ and then mixed with polymer to form a composite film. Annealing may do one or more of driving unreacted precursors to reaction, initiating crystallization, and growing crystallites, which in turn can include fusing if the crystallites are grown across particles. In some embodiments, the argyrodite (and unreacted precursors, if present) are mixed with polymer to form a composite film without annealing.

At 304, the composite film is heated under pressure as described above with respect to operation 204 of FIG. 2. According to various embodiments, operations 304 and 304 may include sintering in which crystallites are grown and can include fusing of discrete particles. During sintering a particle compact body (green body) is transformed into polycrystalline, monolithic body.

The fused particles may be characterized by having necks or narrowed regions in which multiple particles are fused together. For example, particles as ball milled may be nominally circular; as they particles are sintered, they fuse together to form larger, less circular particles. The sintered together particles form a particle network in the composite, with a particular composite including multiple particle networks. The fused particles may be characterized by having dimensions in the plane of the film (x-y plane) much larger than in the z-direction. For example, the aspect ratio of the particles (z:x or z:y dimensions) may be less than 0.8, 0.5, or 0.1.

Sintering involves bulk diffusion from particle to particle via interparticle necks; temperature is raised to around ½ to ¾ of the melting temperatures of the particles for the process to occur. In case of oxide conductors those temperatures are in range above 1000° C., which can significantly restrict material integration, phase stability, compatibility with other materials, and addi to the processing budget. For argyrodite conductors described herein, processing temperatures may at most 500° C.-550° C., which makes them much more processable than oxides. Argyrodite formation occurs at as low as 150° C., and grains start to grow at 300° C.

Figure 4:
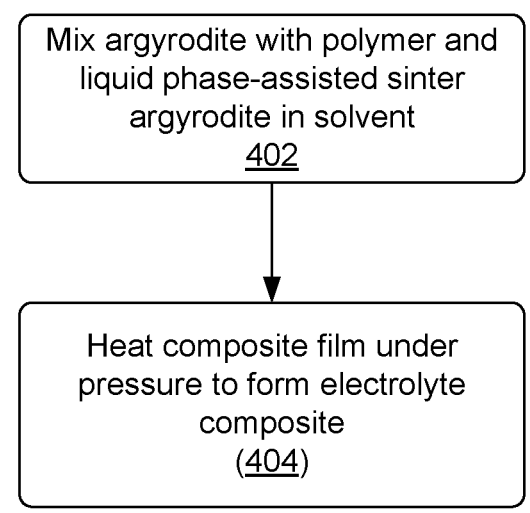
FIG. 4 is a process flow diagram that shows certain operations in methods of forming a composite that use liquid phase-assisted sintering.

In some embodiments, liquid phase-assisted sintering is performed. Liquid phase-assisted sintering may be performed at low temperatures, e.g., no more than 350° C. or no more than 300° C. Argyrodites are fully soluble in ethanol and partially soluble in solvents such as tetrahydrofuran, N-methyl pyrrolidone, acetonitrile, and ethyl propionate. Solubility in common solvents can be utilized in liquid phase-assisted sintering of those materials to further ease processing. FIG. 4 is a process flow diagram showing operations in a method of forming a composite including liquid phase-assisted sintering. At operation 402, the argyrodite is mixed with polymer and sintered in a solvent.

Prior to or as part of operation 402, the argyrodites can be synthesized 'in-situ' via a solvent approach. The polymer can be added during or after the synthesis and the mixture, in a form of a solution or a slurry, can be cast to a form a green composite film. Small amounts of argyrodite solvent (e.g., ethanol, tetrahydrofuran, N-methyl pyrrolidone, acetonitrile, or ethyl propionate) can be added to a composite slurry. The solvent can be incorporated into the composite films in various ways for instance, as a main solvent, co-solvent, slurry additive, solvent-containing inorganic powder, exposure of composite to vapors, soaking, etc. During processing, the solvent enables better lubrication of particles, interparticle transfer of materials via liquid phase, while during evaporation it transforms dissolved argyrodite into solid, while improving a particle-to-particle contact, decreasing porosity, and improving conductivity and mechanical strength of the materials. Liquid phase-assisted sintering can help with reducing processing requirements such as pressure, temperature and (potentially) time. Once sintering is performed, the composite film is heated under pressure in an operation 404 to improve conductivity.

Devices

The composites described herein may be incorporated into any device that uses an ionic conductor, including but not limited to batteries and fuel cells. In a lithium battery, for example, the composite may be used as an electrolyte separator. In some embodiments, it may be used in the electrolyte separator with an undoped argyrodite in one or more of the electrodes. In some embodiments, it may not be used in an anode, for example, with the possibility of reducing out the metal dopant.

In some embodiments, the hybrid solid compositions do not include an added salt. Lithium salts (e.g., LiPF6, LiTFSI), potassium salts, sodium salts, etc., may not be necessary due to the contacts between the ion conductor particles. In some embodiments, the solid compositions consist essentially of ion-conductive inorganic particles and an organic polymer matrix. However, in alternative embodiments, one or more additional components may be added to the hybrid solid composition.

The electrode compositions further include an electrode active material, and optionally, a conductive additive. Example cathode and anode compositions are given below.

For cathode compositions, the table below gives examples of compositions.

| Constituent | Active material | Thiophilic Metal Doped Argyrodite | Electronic conductivity additive | Organic phase |
| --- | --- | --- | --- | --- |
| Examples | Transition Metal Oxide Transition Metal Oxide with layer structure NMC | $Li_{5.4}M_{0.1}PS_{4.6}Cl_{1.4}$ $Li_{5.8}M_{0.1}PS_5Cl$ $Na_{5.8}M_{0.1}PS_5Cl$ | Carbon-based Activated carbons CNTs Graphene Graphite Carbon fibers Carbon black (e.g., Super C) | Hydrophobic block copolymers having soft and hard blocks SEBS |
| Wt % range | 65%-88% | 10%-33% | 1%-5% | 1%-5% |

According to various embodiments, the cathode active material is a transition metal oxide, with lithium nickel cobalt manganese oxide (LiMnCoMnO$_2$, or NMC) an example. Various forms of NMC may be used, including $LiNi_{0.6}Mn_{0.2}Co_{0.2}O_2$ (NMC-622), $LiNi_{0.4}Mn_{0.3}Co_{0.3}O_2$ (NMC-4330), etc. The lower end of the wt % range is set by energy density; compositions having less than 65 wt % active material have low energy density and may not be useful.

Any appropriate argyrodite may be used. $Li_{5.4}Cu_{0.1}PS_{4.6}Cl_{1.4}$ is an example of an argyrodite that retains high ionic conductivity and suppresses hydrogen sulfide. Compositions having less than 10 wt % argyrodite have low Li$^+$ conductivity.

An electronic conductivity additive is useful for active materials that, like NMC, have low electronic conductivity. Carbon black is an example of one such additive, but other carbon-based additives including other carbon blacks, activated carbons, carbon fibers, graphites, graphenes, and carbon nanotubes (CNTs) may be used. Below 1 wt % may not be enough to improve electronic conductivity while greater than 5% leads to decrease in energy density and disturbing active material-argyrodite contacts.

Any appropriate organic phase may be used. In particular embodiments, hydrophobic block copolymers having both plastic and elastic copolymer segments are used. Examples include styrenic block coploymers such as styrene-ethylene/butylene-styrene (SEBS), styrene-butadiene-styrene (SBS), styrene-isoprene-styrene (SIS), styrene-isoprene/butadiene-styrene (SIBS), styrene-ethylene/propylene (SEP), Styrene-Ethylene/Propylene-Styrene (SEPS), and isoprene rubber (IR). Below 1 wt % may not be enough to achieve desired mechanical properties while greater than 5% leads to decrease in energy density and disturbing active material-argyrodite-carbon contacts.

For anode compositions, the table below gives examples of compositions.

| Constituent | Primary active material | Secondary active material | Argyrodite | Electronic conductivity additive | Organic phase |
|---|---|---|---|---|---|
| Examples | Si-containing Elemental Si Si alloys, e.g., Si alloyed with one or more of Al, Zn, Fe, Mn, Cr, Co, Ni, Cu, Ti, Mg, Sn, Ge | Graphite | $Li_{5.4}M_{0.1}PS_{4.6}Cl_{1.4}$ $Li_{5.8}M_{0.1}PS_5Cl$ $Na_{5.8}M_{0.1}PS_5Cl$ | Carbon-based Activated carbons CNTs Graphene Carbon fibers Carbon black (e.g., Super C) | Hydrophobic block copolymers having soft and hard blocks SEBS |
| Wt % range | Si is 15%-50% | 5%-40% | 10%-50% | 0%-5% | 1%-5% |

Graphite is used as a secondary active material to improve initial coulombic efficiency (ICE) of the Si anodes. Si suffers from low ICE (e.g., less than 80% in some cases) which is lower than ICE of NMC and other cathodes causing irreversible capacity loss on the first cycle. Graphite has high ICE (e.g., greater than 90%) enabling full capacity utilization. Hybrid anodes where both Si and graphite are utilized as active materials deliver higher ICE with increasing graphite content meaning that ICE of the anode can match ICE of the cathode by adjusting Si/graphite ratio thus preventing irreversible capacity loss on the first cycle. ICE can vary with processing, allowing for a relatively wide range of graphite content depending on the particular anode and its processing. In addition, graphite improves electronic conductivity and may help densification of the anode.

Any appropriate argyrodite may be used. Any appropriate argyrodite may be used. $Li_{5.4}Cu_{0.1}PS_{4.6}Cl_{1.4}$ is an example of an argyrodite that retains high ionic conductivity and suppresses hydrogen sulfide. Compositions having less than 10 wt % argyrodite have low $Li^+$ conductivity. As noted above, in some embodiments, a doped argyrodite may be used in the separator but not used or limited in the anode.

A high-surface-area electronic conductivity additive (e.g., carbon black) may be used some embodiments. Si has low electronic conductivity and such additives can be helpful in addition to graphite (which is a great electronic conductor but has low surface area). However, electronic conductivity of Si alloys can be reasonably high making usage of the additives unnecessary in some embodiments. Other high-surface-area carbons (carbon blacks, activated carbons, graphenes, carbon nanotubes) can also be used instead of Super C.

Any appropriate organic phase may be used. In particular embodiments, hydrophobic block copolymers having both plastic and elastic copolymer segments are used. Examples include styrenic block coploymers such as styrene-ethylene/butylene-styrene (SEBS), styrene-butadiene-styrene (SBS), styrene-isoprene-styrene (SIS), styrene-isoprene/butadiene-styrene (SIBS), styrene-ethylene/propylene (SEP), Styrene-Ethylene/Propylene-Styrene (SEPS), and isoprene rubber (IR). Below 1 wt % may not be enough to achieve desired mechanical properties while greater than 5% leads to decrease in energy density and disturbing active material-argyrodite-carbon contacts.

Provided herein are alkali metal batteries and alkali metal ion batteries that include an anode, a cathode, and a compliant solid electrolyte composition as described above operatively associated with the anode and cathode. The batteries may include a separator for physically separating the anode and cathode; this may be the solid electrolyte composition.

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. In some embodiments, the solid-state composite electrolytes described herein uniquely enable both a lithium metal anode, by preventing dendrite formation, and sulfur cathodes, by not dissolving polysulfide intermediates that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

In some embodiments, the solid electrolyte compositions serve as electrolytes between anodes and cathodes in alkali ion batteries that rely on intercalation of the alkali ion during cycling.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

Figure 5A:
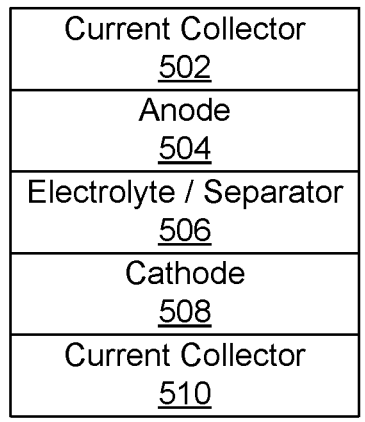
FIGS. 5A-5C show examples of schematic of cells including thiophilic metal doped agyrodite-containing composites.

FIG. 5A shows an example of a schematic of a cell according to certain embodiments of the invention. The cell includes a negative current collector 502, an anode 504, an electrolyte/separator 506, a cathode 508, and a positive current collector 510. The negative current collector 502 and the positive current collector 510 may be any appropriate electronically conductive material, such as copper, steel, gold, platinum, aluminum, and nickel. In some embodiments, the negative current collector 502 is copper and the positive current collector 510 is aluminum. The current collectors may be in any appropriate form, such as a sheet, foil, a mesh, or a foam. According to various embodiments, one or more of the anode 504, the cathode 508, and the electrolyte/separator 506 is a solid-state composite including a thiophilic metal doped argyrodite as described above. In some embodiments, two or more of the anode 504, the cathode 508, and the electrolyte 506 is solid-state composite including a thiophilic metal doped argyrodite, as described above.

In some embodiments, a current collector is a porous body that can be embedded in the corresponding electrode. For example, it may be a mesh. Electrodes that include hydrophobic polymers as described above may not adhere well to current collectors in the form of foils; however meshes provide good mechanical contact. In some embodiments, two composite films as described herein may be pressed against a mesh current collector to form an embedded current collector in an electrode.

Figure 5B:
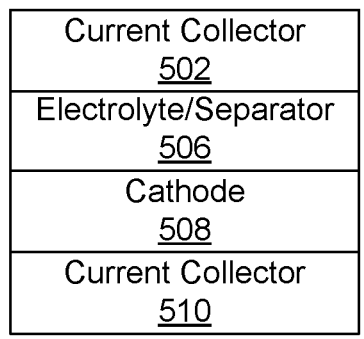
Figure 5C:
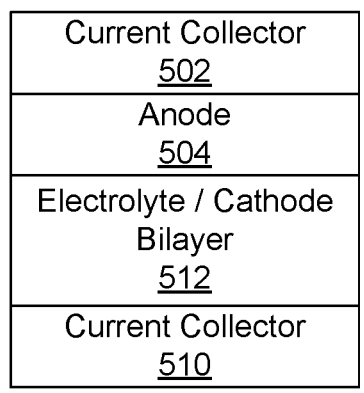

FIG. 5B shows an example of schematic of a lithium metal cell as-assembled according to certain embodiments of the invention. The cell as-assembled includes a negative current collector 502, an electrolyte/separator 506, a cathode 508, and a positive current collector 510. Lithium metal is generated on first charge and plates on the negative current collector 502 to form the anode. One or both of the electrolyte 506 and the cathode 508 may be a composite material as described above. In some embodiments, the cathode 508 and the electrolyte 506 together form an electrode/electrolyte bilayer. FIG. 5C shows an example of a schematic of a cell according to certain embodiments of the invention. The cell includes a negative current collector 502, an anode 504, a cathode/electrolyte bilayer 512, and a positive current collector 510. Each layer in a bilayer may include argyrodite. Such a bilayer may be prepared, for example, by preparing an electrolyte slurry and depositing it on an electrode layer.

All components of the battery can be included in or packaged in a suitable rigid or flexible container with external leads or contacts for establishing an electrical connection to the anode and cathode, in accordance with known techniques.

EXAMPLES $Li_{5.4}Cu_{0.1}PS_{4.6}Cl_{1.4}$ was produced by ball milling the appropriate amounts of $P_2S_5$, $Li_2S$, LiCl and CuS. A portion of the ball milled materials were annealed at 450° C. and comparisons of conductivity and hydrogen sulfide release were made with the parent material lacking copper.

Comparing annealed $Li_{5.4}Cu_{0.1}PS_{4.6}Cl_{1.4}$ to the parent $Li_{5.6}PS_{4.6}Cl_{1.4}$, also annealed, showed a conductivity of 6.24 mS/cm, compared to 7.86 mS/cm, or a 79% retention in conductivity. Hydrogen sulfide release in the copper doped material was found to be only 59% of the parent material, showing a clear advantage.

Figure 6:
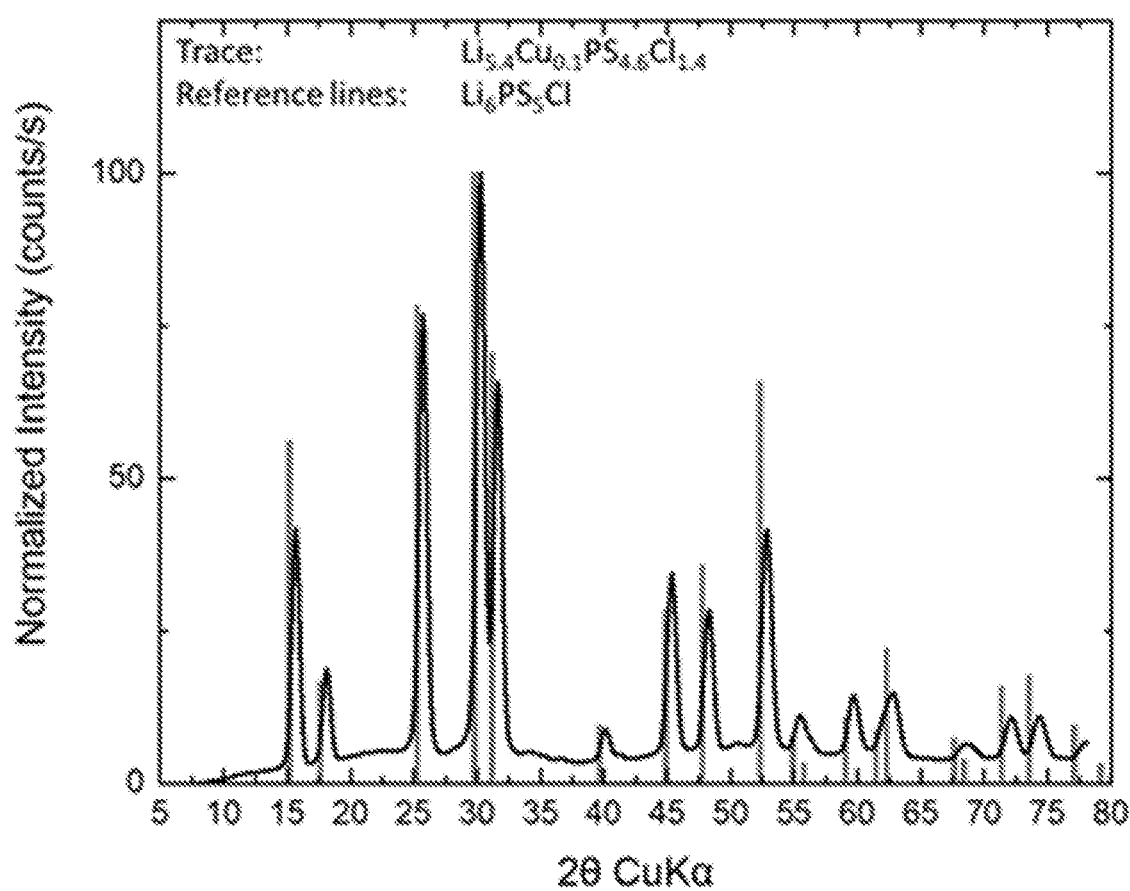
FIG. 6 is a powder diffraction pattern of Cu-doped agyrodite $Li_{5.4}Cu_{0.1}PS_{4.6}Cl_{1.4}$ with overlaid reference lines from the argyrodite $Li_6PS_5Cl$.

FIG. 6 is a powder diffraction pattern of $Li_{5.4}Cu_{0.1}PS_{4.6}Cl_{1.4}$ with overlaid reference lines from the argyrodite $Li_6PS_5Cl$. The strong agreement between measured pattern and reference lines indicates that the new, Cu-containing, material has an argyrodite structure. The absence of peaks not corresponding to reference lines indicates that there are no major crystalline contaminates.

Figure 7:
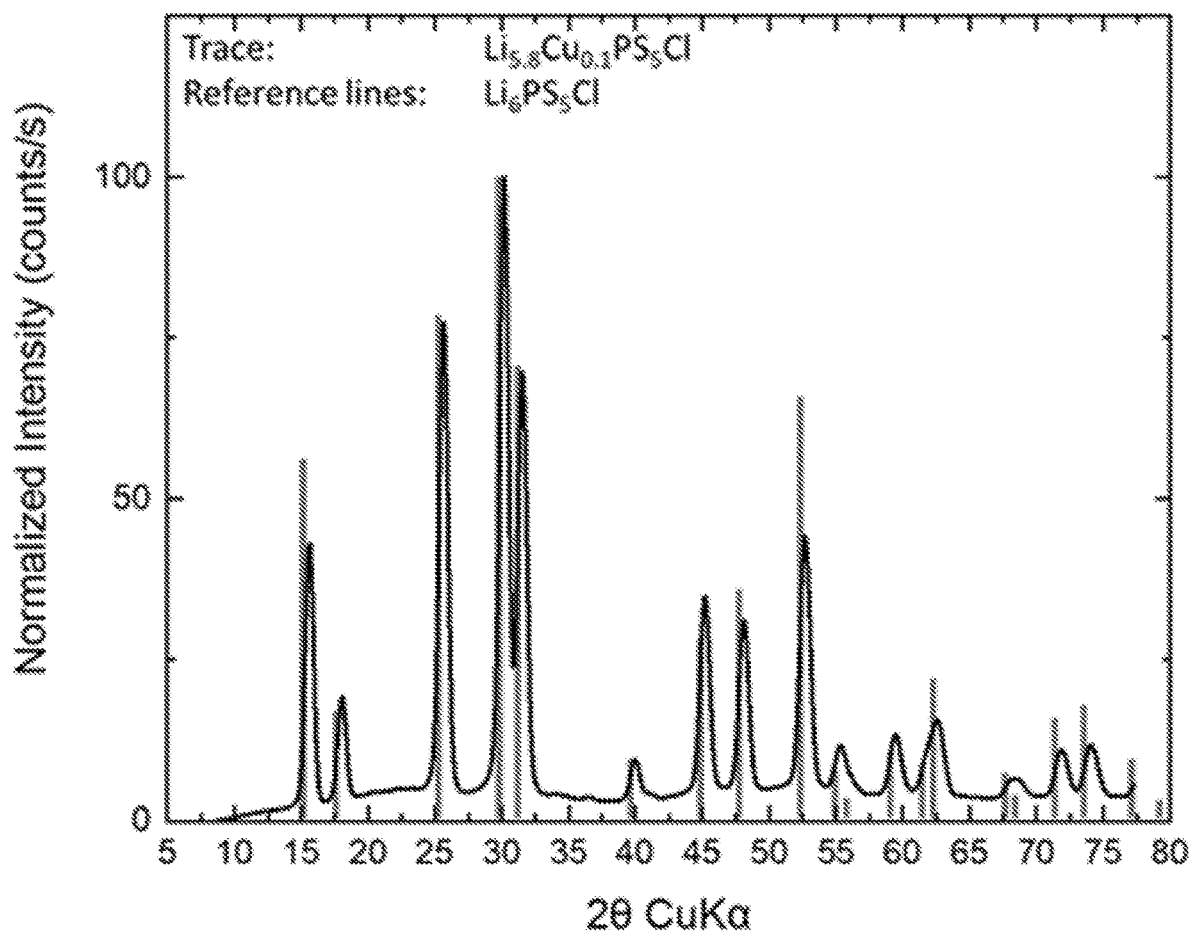
FIG. 7 is a powder diffraction pattern of Cu-doped argyrodite $Li_{5.8}Cu_{0.1}PS_5Cl$ with overlaid reference lines from the argyrodite $Li_6PS_5Cl$.

$Li_{5.8}Cu_{0.1}PS_5Cl$ was produced by ball milling the appropriate amounts of $P_2S_5$, $Li_2S$, LiCl and CuS. A portion of the ball milled materials were annealed at 450° C. FIG. 7 is a powder diffraction pattern of $Li_{5.8}Cu_{0.1}PS_5Cl$ with overlaid reference lines from the argyrodite $Li_6PS_5Cl$. The strong agreement between measured pattern and reference lines indicates that the new, Cu-containing, material has an argyrodite structure. The absence of peaks not corresponding to reference lines indicates that there are no major crystalline contaminates.

Figure 8:
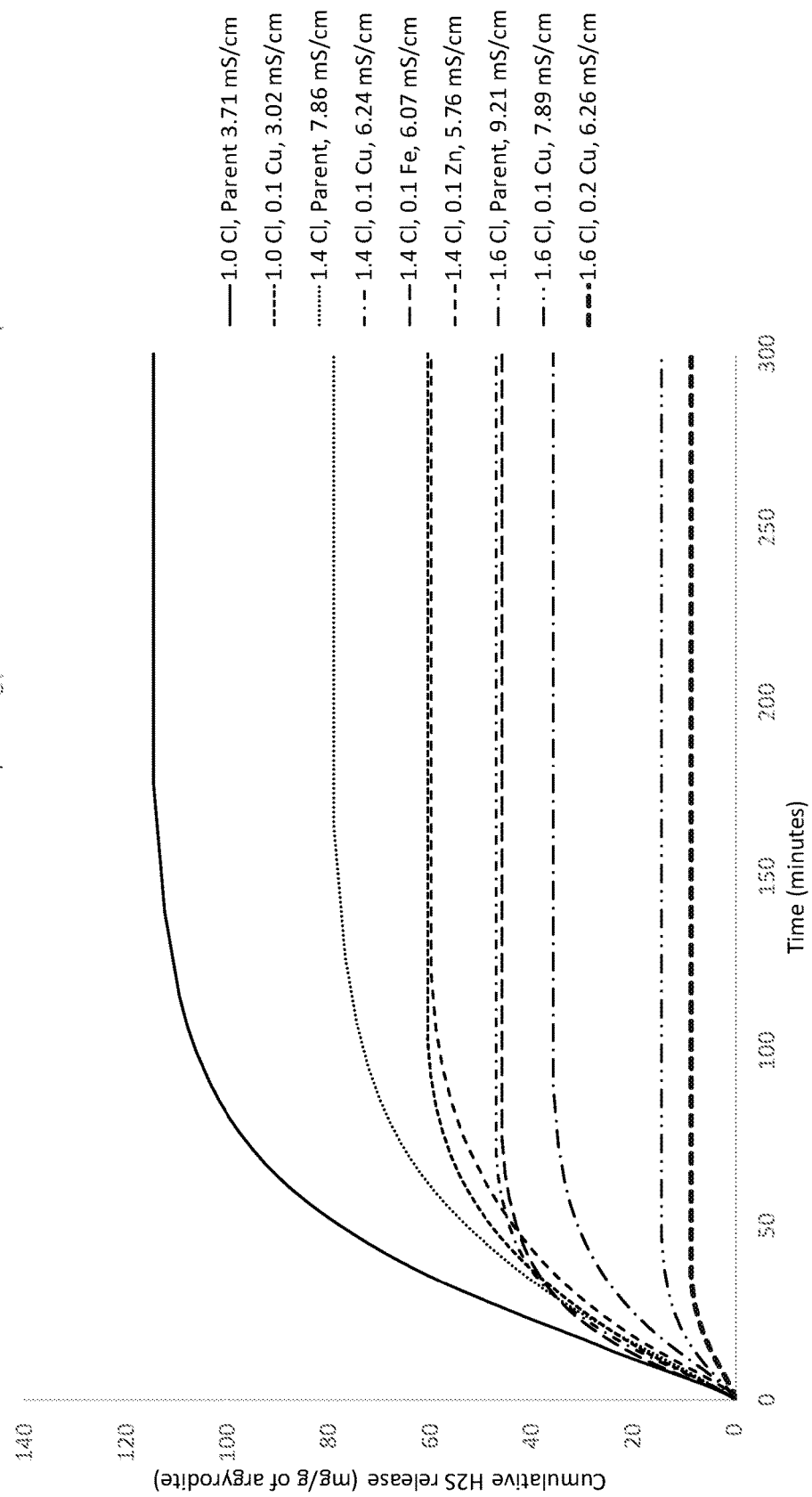
FIG. 8 is a graph showing $H_2S$ release of various thiophilic metal doped argyrodite sulfide-based ion conductors and their compounds.

FIG. 8 shows cumulative release of hydrogen sulfide gas, normalized to mg $H_2S$/g argyrodite, of the various metal doped and parent materials. Conductivities of the materials are listed in the legend. The results in FIG. 8 show 1) that metal doping reduces $H_2S$ with different Cl concentrations, 2) different dopant metals work (and to somewhat different extents), and 3) higher doping levels suppress hydrogen sulfide release to a greater extent, with some decrease in conductivity.

Additional Thiophilic Metal Doped Sulfide-Based Ion Conductors

Incorporation of thiophilic metals may have benefits in other sulfide-based ion conductors, although the utility of this approach is likely to depend heavily on the structure of the specific material. For example, glassy $Li_3PS_4$ alone, or doped with other salts such as LiI, have been used as lithium ion conductors in li-ion batteries. Thiophilic metals could likely be incorporated into these glasses, but the materials have very low hydrogen sulfide release on their own and therefore the likely decrease in lithium ion conductivity in these already relatively poorly conducting materials would not be justified. In contrast, addition of thiophilic metals to $Li_7P_3S_{11}$ may provide some benefit as this material appears to have a greater extent of hydrogen sulfide release compared to $Li_3PS_4$. The most reactive sulfur site in this material may be the bridging sulfur in the $Li_3PS_3$—S—$PS_3Li_3$ portion of the structure. While this sulfur has two covalent bonds to phosphorus atoms, and no ionic bond to a lithium atom, the crystal structure of this material does show a likely weak interaction with a lithium atom in the structure. Thus, in some embodiments, this lithium atom is replaced with a thiophilic metal, which may inhibit the release of hydrogen sulfide associated with this sulfur center. This effect is expected to be weaker than in the argyrodite case where all thiophilic metal centers are bound strongly to one or more $S^{2-}$ sites, which are otherwise the most reactive type of sites in sulfide type lithium-ion conductors. Other lithium ion conducting sulfides, such as $Li_{10}GeP_2S_{12}$, may also derive some benefit from thiophilic metal doping as described herein, but as in the case of $Li_3PS_4$, the baseline hydrogen sulfide release is expected to be less severe because all sulfur atoms in this system and its derivatives are in less reactive bonding environments.

The invention claimed is:

1. A composition comprising:
an alkali metal argyrodite sulfide-based halogen-containing ion conductor doped with a thiophilic metal, wherein the thiophilic metal is selected from manganese (Mn), iron (Fe), cobalt (Co), nickel (Ni), copper (Cu), zinc (Zn), mercury (Hg), molybdenum (Mo), and combinations thereof, wherein the ratio of thiophilic metal atoms to sulfur atoms in the alkali metal argyrodite sulfide-based ion conductor is between 1:120 and 1:20.

2. The composition of claim 1, wherein the alkali metal is lithium (Li), sodium (Na) or potassium (K).

3. The composition of claim 1, wherein the alkali metal is lithium.

4. The composition of claim 1, wherein the alkali metal argyrodite sulfide-based ion conductor is given by the formula:

$$A_{7-x-(z*y)}M^z_yPS_{6-x}Hal_x$$

wherein
A is the alkali metal;
M is the thiophilic metal;
Hal is selected from chlorine (Cl), bromine (Br), and iodine (I);
z is the oxidation state of the metal;
$0<x\leq2$; and
$0<y<(7-x)/z$.

5. The composition of claim 4, wherein $z>+1$.

6. The composition of claim 4, wherein $z=+2$.

7. The composition of claim 4, wherein $1\leq x\leq 1.6$.

8. The composition of claim 4, wherein $0.1\leq y\leq 2-x$.

9. The composition of claim 1, wherein the alkali metal argyrodite sulfide-based ion conductor is given by the formula: $A_{7-x+n-(z*y)}M^z_yPS_{6-x}Hal_{x+n}$ wherein
A is the alkali metal;
M is the thiophilic metal;
Hal is selected from chlorine (Cl), bromine (Br), and iodine (I);
z is the oxidation state of the metal;
$0.05\leq n\leq 0.9$
$-3.0x+1.8\leq n\leq -3.0x+5.7$
$0\leq y<(7-x)/z$; and
$0<x\leq 2$.

10. The composition of claim 9, wherein $z>+1$.

11. The composition of claim 9, wherein $z=+2$.

12. The composition of claim 1, wherein the alkali metal argyrodite sulfide-based ion conductor is single phase material.

13. The composition of claim 1, wherein the argyrodite is $Li_{5.8}Cu_{0.1}PS_5Cl$ or $Li_{5.4}Cu_{0.1}PS_{4.6}Cl_{1.4}$.

14. A composition comprising:
a composite film of particles comprising an argyrodite according to claim 1 in a polymer.

* * * * *